May 6, 1924.
F. M. KILFOYLE
NUT LOCK
Filed Aug. 1, 1922
1,492,637
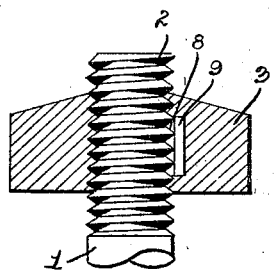
Fig. 4.
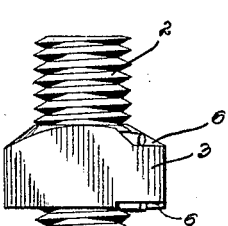
Fig. 1.
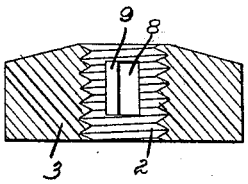
Fig. 6.
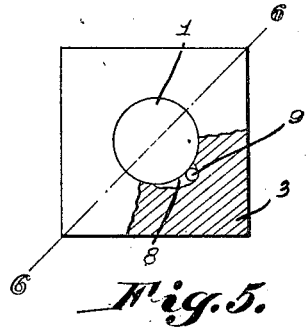
Fig. 5.
Fig. 3.
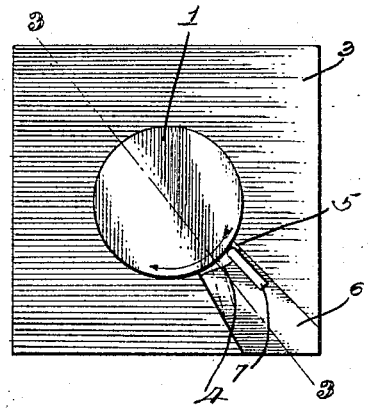
Fig. 2.
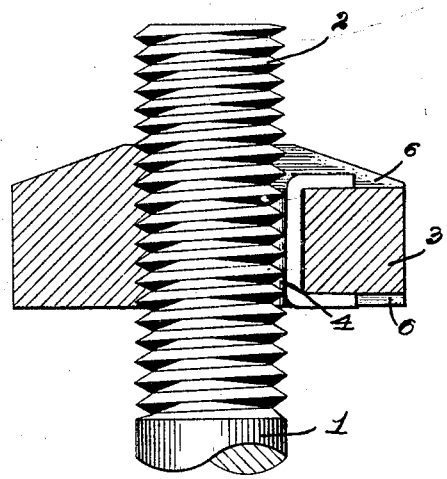
F. M. Kilfoyle,
Inventor
By C. A. Snow & Co.
Attorney Patented May 6, 1924.

1,492,637

UNITED STATES PATENT OFFICE.

FRED M. KILFOYLE, OF STORRS, UTAH.

NUT LOCK.

Application filed August 1, 1922. Serial No. 579,069.

*To all whom it may concern:*

Be it known that I, FRED M. KILFOYLE, a citizen of the United States, residing at Storrs, in the county of Carbon and State of Utah, have invented a new and useful Nut Lock, of which the following is a specification.

This invention relates to a nut lock, one of its objects being to provide a simple form of lock which does not require mutilation of the threads on the bolt and can be used like on ordinary nut and bolt except when the nut is to be held against retrograde movement in which case the nut can be held by the insertion of a suitable key in a space provided therefor.

Another object is to provide a nut lock in which the securing means is carried solely by the nut, it being possible to make the nut at practically no increased cost over the ordinary nut.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is an elevation of a nut lock embodying the present improvements.

Figure 2 is an enlarged end view thereof.

Figure 3 is a section on line 3—3, Figure 2.

Figure 4 is a section through a modified form of lock.

Figure 5 is a plan view of the nut, a part being broken away.

Figure 6 is a section on line 6—6, Figure 5.

Referring to the figures by characters of reference 1 designates a bolt or similar element provided with unbroken threads 2 adapted to be engaged by a nut 3. The nut is of the same construction as any ordinary nut with the exception that the threads therein are intersected by a longitudinal groove 4 one side wall of which is cut radially or substantially radially as shown at 5 while the inner or bottom wall of the groove is tangentially disposed relative to the periphery of the bolt. Thus the groove gradually diminishes in depth from one side to the other. The faces of the nut are formed with recesses 6 extending to the side of the nut, these recesses communicating at their inner ends with the ends of the groove 4. Under ordinary conditions the nut can be screwed onto or unscrewed from the bolt like an ordinary nut. When it is desired to secure the nut against retrograde movement, however, a small key 7 is inserted within the groove 4, its ends being bent outwardly as shown in Figure 1 so that they can rest in the recesses 6. The key is cylindrical and the diameter thereof is slightly less than the greatest depth of the groove 4. Thus as long as the nut is being screwed onto the bolt in the direction indicated by the arrow in Figures 2 and 4 the key will be held within this deep portion of the groove. When the rotation of the nut is to be reversed, however, any attempt will result in the key becoming wedged between the tangential inner or bottom wall of the groove 4 and the threads on the bolt with the result that a sufficient gripping action will take place to hold the nut. Of course by pressing the key against the wall 5 of the recess the nut can be unscrewed but if the key is not restrained the parts will operate automatically to hold the nut against retrograde movement.

Instead of using a key with projecting ends as shown, a recess 8 can be formed in the wall of the threaded opening so as to intersect the threads. In this recess can be loosely seated a roller or ball 9 of soft metal which will not mutilate the threads on the bolt. The recess is substantially of the same shape as that of the nut 3 heretofore described. Thus when the nut is turned in one direction the key 9 will move to the deepest portion of the recess 8 where it will not bind on the bolt but when the nut is rotated in the opposite direction the key will become wedged between the wall of the recess and the bolt so as to hold the nut against relative movement.

What is claimed is:—

The combination with a threaded member, of a nut engaging the same and having a recess intersecting the threads in the nut, said recess diminishing in depth from one side to the other thereof, and a key insertible within the recess and having offset ends to hold it assembled with the nut, there being recesses in the nut to receive the offset ends of the key.

In testimony that I claim the foregoing as my own, I have hereto affixed my signature in the presence of two witnesses.

FRED M. KILFOYLE.

Witnesses:
RAY P. DYNENG,
J. J. JENSEN.